United States Patent
Nakane et al.

(10) Patent No.: US 6,907,088 B1
(45) Date of Patent: Jun. 14, 2005

(54) CONTACTLESS IC CARD FOR PREVENTING INCORRECT DATA RECOVERY IN DEMODULATION OF AN AMPLITUDE-MODULATED CARRIER WAVE

(75) Inventors: Joji Nakane, Nara (JP); Tatsumi Sumi, Takatsuki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 630 days.

(21) Appl. No.: 09/665,133

(22) Filed: Sep. 19, 2000

(30) Foreign Application Priority Data

Sep. 22, 1999 (JP) .............................. 11-268632

(51) Int. Cl.[7] .............................. H03D 1/24; H03D 1/04
(52) U.S. Cl. ...................... 375/320; 375/316; 329/349; 329/347
(58) Field of Search ................. 375/320, 316, 375/259, 317, 346; 329/349, 347; 340/825.54, 825.34; 455/41

(56) References Cited

U.S. PATENT DOCUMENTS

| | | | | |
|---|---|---|---|---|
| 3,628,059 A | * | 12/1971 | Niu .............................. 327/72 |
| 5,220,158 A | * | 6/1993 | Takahira et al. ............. 235/492 |
| 5,449,894 A | * | 9/1995 | Bruhnke et al. ............. 235/492 |
| 5,812,942 A | * | 9/1998 | Allen et al. .................. 455/139 |
| 5,864,588 A | * | 1/1999 | Miyamoto .................... 375/326 |
| 5,930,304 A | * | 7/1999 | Hollenbeck et al. ......... 375/316 |
| 5,949,823 A | * | 9/1999 | Suga et al. .................. 375/256 |
| 6,525,362 B2 | * | 2/2003 | Sadayuki .................... 257/298 |

FOREIGN PATENT DOCUMENTS

| | | |
|---|---|---|
| FR | 2751148 | 1/1998 |
| JP | 1013312 | 1/1998 |
| WO | 9938114 | 7/1999 |

* cited by examiner

Primary Examiner—Stephen Chin
Assistant Examiner—Jason M. Perilla

(57) ABSTRACT

In a contactless IC card that performs envelope detection on an ASK-modulated carrier wave and demodulates the carrier wave to recover data piggybacked thereon, demodulation is suspended during periods where there is no possibility of a change of a data value (from data 0 to data 1, or from data 1 to data 0) in the digital data piggybacked on the carrier wave. In so doing, incorrect data recovery can be prevented even when noise arises in power supply voltage waveform due to power consumption of an internal memory or the like.

18 Claims, 10 Drawing Sheets

CONTACTLESS IC CARD FOR PREVENTING INCORRECT DATA RECOVERY IN DEMODULATION OF AN AMPLITUDE-MODULATED CARRIER WAVE

This application is based on an application No. H11-268632 filed in Japan, the content of which is hereby incorporated by reference.

BACKGROUND OF THE INVENTION

1. Field of the Invention

The present invention relates to a contactless IC card for receiving a carrier wave amplitude-modulated with a modulation factor lower than 100% and demodulating the amplitude-modulated carrier wave to recover data carried thereon, and in particular relates to a technique for preventing incorrect data recovery in the demodulation.

2. Description of Related Art

In recent years, a contactless IC card system made up of an IC card and a reader/writer (hereinafter, "R/W") which performs contactless data communication with the IC card through a fixed-frequency carrier wave has been increasingly considered for adoption in systems such as train ticket collecting systems, security systems, and electronic cash systems. The general construction of such a contactless IC card system is briefly explained below.

FIG. 1 shows the general construction of a contactless IC card system. As illustrated, the contactless IC card system is roughly made up of a contactless IC card 10 equipped with an IC 11 and a loop coil 12, and an R/W 30 equipped with a loop coil 21, a modulation/demodulation unit 22, a control unit 23, and an input/output unit 24.

The loop coil 21 serves as an antenna for transmitting/receiving a carrier wave which has been modulated with data, to/from the contactless IC card 10. The modulation/demodulation unit 22 modulates a carrier wave with data to be transmitted to the contactless IC card 10, or demodulates a carrier wave received from the contactless IC card 10 to recover data piggybacked thereon. The control unit 23 exercises control over the entire R/W 30, including control of modulated/demodulated data. The input/output unit 24 performs data input/output.

The R/W 30, which is installed in a train ticket collecting gate or the like, performs amplitude-modulation (ASK (Amplitude Shift Keying) modulation) on a carrier wave of a predetermined frequency (e.g. 13.56 MHz) using data to be transmitted, and transmits the amplitude-modulated carrier wave to the contactless IC card 10 which is used for a season ticket or the like. Thus, for data transfer from the R/W 30 to the contactless IC card 10, ASK modulation is employed that defines digital data 0 and 1 in accordance with the level of the amplitude of the carrier wave. Here, the modulation factor of the ASK modulation never reaches 100%. The use of ASK modulation with a modulation factor below 100% enables high speed transfer with a narrow occupied bandwidth, and therefore allows a contactless IC card to obtain a proper demodulated signal.

The contactless IC card 10 is a contactless IC card that contains no batteries. In this contactless IC card 10, the loop coil 12 receives the amplitude-modulated carrier wave from the R/W 30. The IC 11 demodulates the received carrier wave to recover the original data carried thereon, according to the demodulation method that corresponds to the modulation method employed in the R/W 30. The IC 11 then performs a predetermined process on the recovered digital data. After this, the contactless IC card 10 transmits a response signal to the R/W 30.

As is clear from the above description, data processing in the contactless IC card 10 is mainly conducted by the IC 11. The construction of this IC 11 is explained below.

FIG. 2 is a block diagram showing the construction of the IC 11. Since the contactless IC card 10 has no batteries, it derives DC power by rectifying the carrier wave transmitted from the R/W 30.

The IC 11 includes a rectifier 40 connected with the loop coil 12 which serves as an antenna for transmitting/receiving a carrier wave to/from the R/W 30, a modulation/demodulation unit 41 connected with the rectifier 40, a control unit 42, a memory unit 43, and a voltage regulator circuit 44. Though the rectifier 40 and the modulation/demodulation unit 41 are connected in series in the figure, they may be connected in parallel.

Once the loop coil 12 has received the ASK-modulated carrier wave from the R/W 30, the rectifier 40 rectifies the carrier wave to generate a power supply voltage, and a demodulator circuit provided in the modulation/demodulation unit 41 demodulates the rectified carrier wave to obtain a demodulated signal.

Here, the demodulated signal contains not only data but also other information such as commands and addresses. The control unit 42 processes the demodulated signal based on these information, after which the data is stored in the memory unit 43. Here, the control by the control unit 42 is done in accordance with a clock signal generated from the carrier wave by a clock generator circuit (not shown in the figure).

The voltage regulator circuit 44 regulates the power supply voltage generated by the rectifier 40 not to exceed a certain threshold voltage. This voltage regulator circuit 44 is a so-called shunt regulator that can protect the circuits inside the contactless IC card 10 from getting damaged by overvoltage, in cases such as where the distance between the contactless IC card 10 and the R/W 30 becomes too short.

A typical construction and operation of the demodulator circuit provided in the modulation/demodulation unit 41 in the contactless IC card 10 are explained next. FIG. 3 is a circuit diagram showing an example construction of the demodulator circuit.

A voltage is generated at both ends of the loop coil 12 when the loop coil 12 receives an ASK-modulated carrier wave from the R/W 30, and the generated voltage is inputted in the demodulator circuit as a power supply voltage (hereinafter, "Vdd") after undergoing rectification and envelope detection. Resistors 901 and 902 are coupled to the input of Vdd, and capacitors 903 and 904 are coupled to the junction (hereinafter, "node A") of the resistors 901 and 902. The capacitor 903 is a smoothing capacitor for eliminating noise which remains after the rectification by the rectifier 40.

The terminal of the capacitor 904 on the opposite side of node A is connected to one input terminal (hereinafter, "node B") of a comparator 908, with one end of node B being coupled with a resistor 905 that is connected to a reference voltage generator circuit for generating a reference voltage (hereinafter, "Vref"). The capacitor 904 and the resistor 905 constitute a differential circuit. Through this differential circuit, only high-frequency components of Vdd having been voltage-divided by the resistors 901 and 902 are conveyed from node A to node B.

The reference voltage generator circuit is also connected to the other input terminal (hereinafter, "node C") of the comparator 908 through a resistor 906. The comparator 908 is equipped with a latch, and is constructed so as to invert its output (i.e. demodulated signal) when the input voltage of node B exceeds a certain level relative to the input voltage of node C. More specifically, the comparator 908 has a hysteresis characteristic between two threshold values (upper and lower threshold values with respect to Vref). With such a characteristic, it is possible to prevent the output of the comparator 908 from being inverted every time a slight change appears in power supply voltage waveform for some reason.

FIG. 4 is a timing chart showing the voltage level of each node in the demodulator circuit shown in FIG. 3. As illustrated, the power supply voltage (Vdd) generated from the ASK-modulated carrier wave received by the loop coil 12 is voltage-divided by the resistors 901 and 902, and the resultant voltage is developed at node A. Differential components of this voltage at node A are propagated to node B. If the voltage at node B exceeds any of the two threshold values (indicated by the upper and lower horizontal dotted lines in node B in the figure) with respect to the reference voltage (Vref) at node C, the demodulated signal is inverted.

In the contactless IC card 10, the control unit 42 and the memory unit 43 consume power during their operations. Here, since the contactless IC card 10 draws its power from radio waves, its source impedance is high. This being so, momentary power consumption causes a sharp drop in power supply voltage, thereby disturbing the power supply voltage waveform and inducing such noise as indicated by arrow A or C in FIG. 4. Meanwhile, this power supply voltage waveform also carries data and accompanying information which need to be recovered through demodulation. Therefore, if noise large enough to exceed any of the threshold values of the comparator 908 is induced by a disturbance in power supply voltage waveform, the output of the comparator 908 is erroneously inverted even when there is actually no change of a data value between 0 and 1. When this happens, the original data cannot be recovered correctly.

For instance, noise due to a voltage sag at point A causes incorrect judgement of data 1 as data 0 (from point A to point B), or a voltage increase due to a rebound at point C causes incorrect judgement of data 0 as data 1 (from point C to point D).

SUMMARY OF THE INVENTION

The present invention aims to prevent incorrect data recovery caused by disturbances in power supply voltage waveform, in a contactless IC card that receives data from an R/W through ASK modulation with a modulation factor lower than 100%.

This object can be achieved by a contactless IC card including: a demodulator circuit which receives a carrier wave that has been ASK-modulated with digital data, and demodulates the ASK-modulated carrier wave to recover the digital data; and a suspending unit which suspends the demodulation by the demodulator circuit during periods where there is no possibility of a change of a data value in the digital data.

With this construction, demodulation is suspended during periods where there is no possibility of a change of a data value (data 0 to data 1, data 1 to data 0) in the data piggybacked on the carrier wave. In so doing, even if noise occurs in power supply voltage waveform, incorrect data recovery can be avoided.

Here, the demodulator circuit may include a detector circuit, a CR time constant circuit, a reference voltage generator circuit, and a comparator circuit. The demodulation may be suspended by establishing a short between the two inputs of the comparator circuit, by reducing the output voltage of the CR time constant circuit through a change in time constant of the CR time constant circuit, or by desensitizing the comparator circuit through an increase in width of the hysteresis of the comparator circuit.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT(S)

The following is a description of embodiments of the present invention with reference to the figures.

First Embodiment

Figure 1:
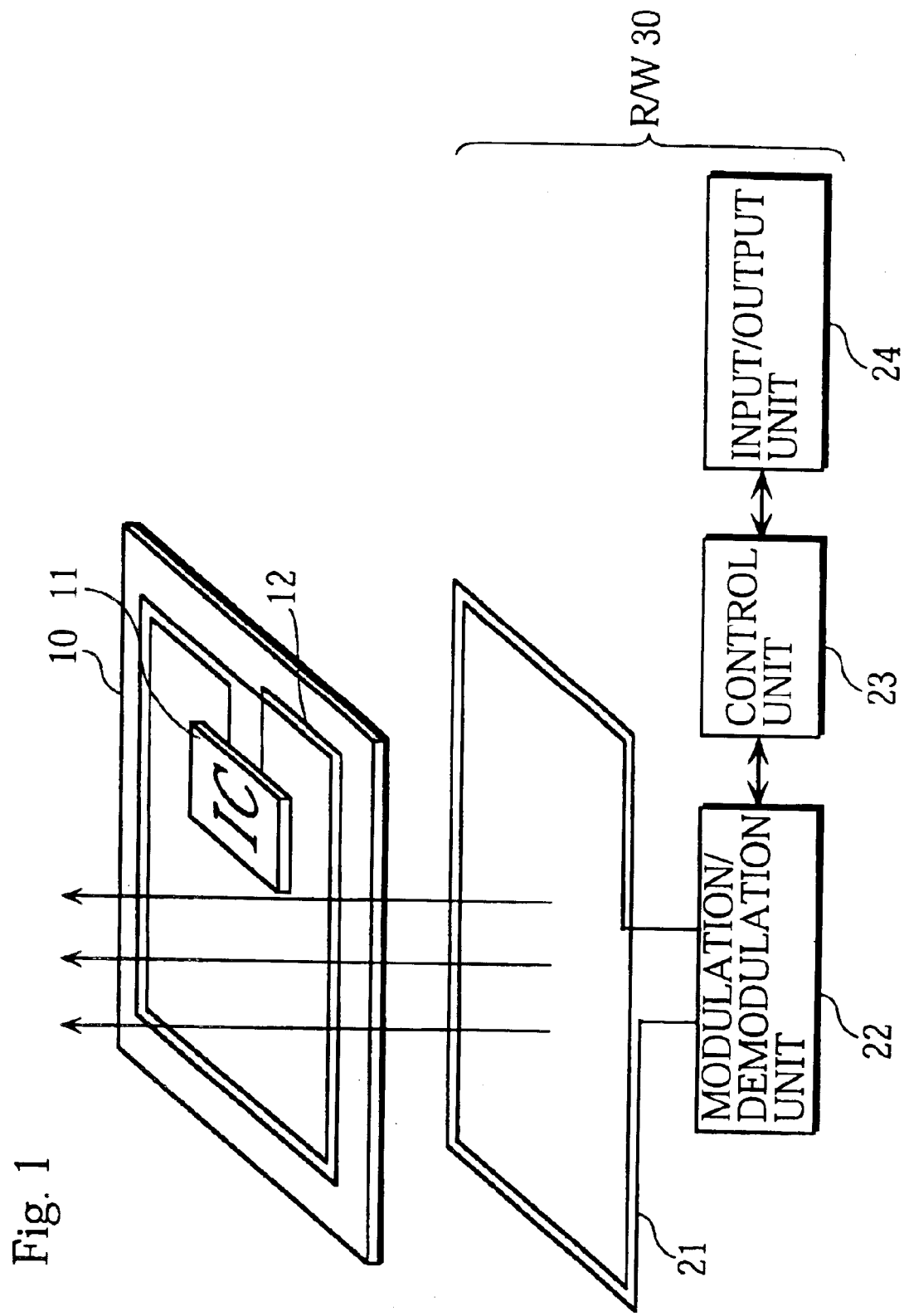
FIG. 1 shows the general construction of a contactless IC card system.
Figure 2:
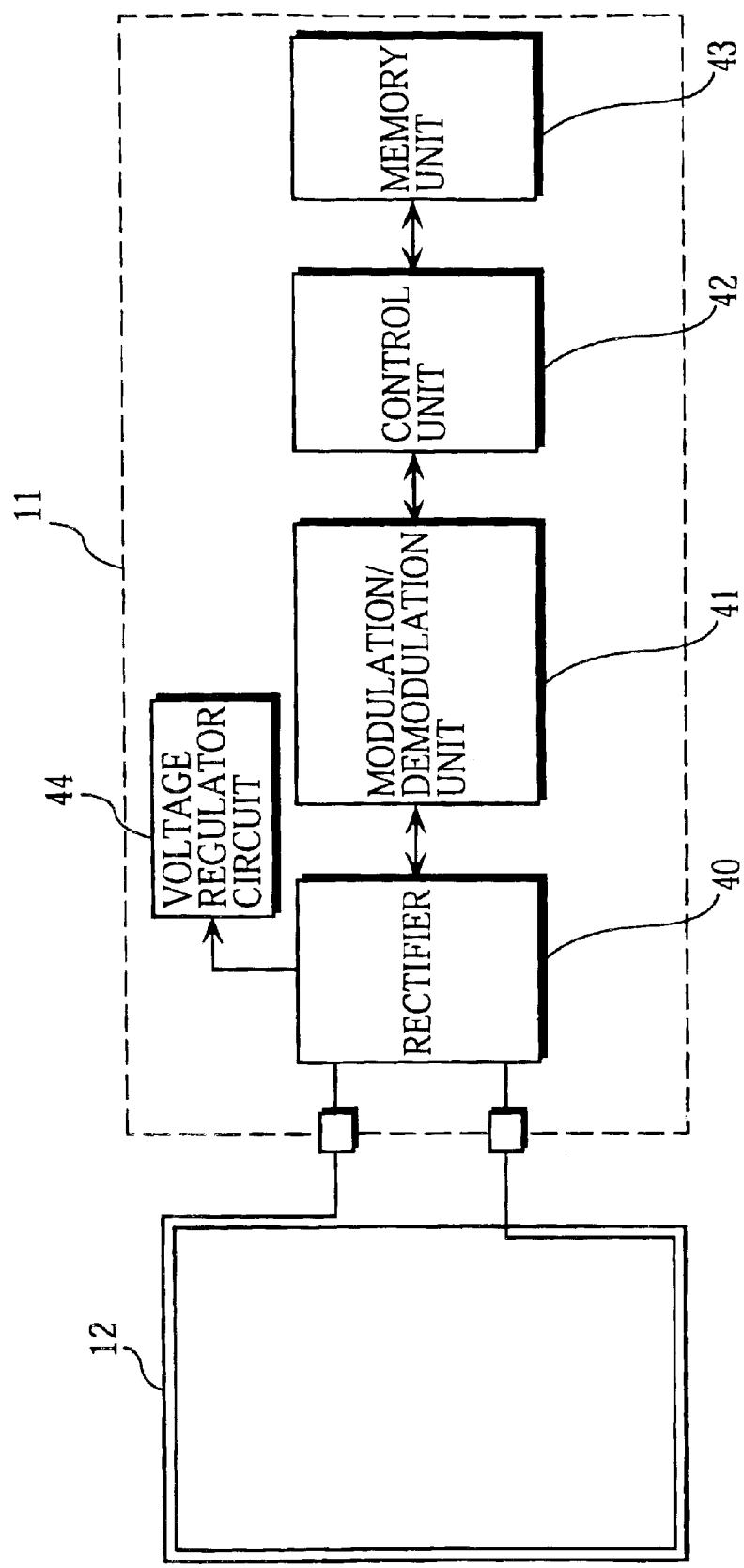
FIG. 2 is a block diagram showing the construction of an IC shown in FIG. 1.
Figure 3:
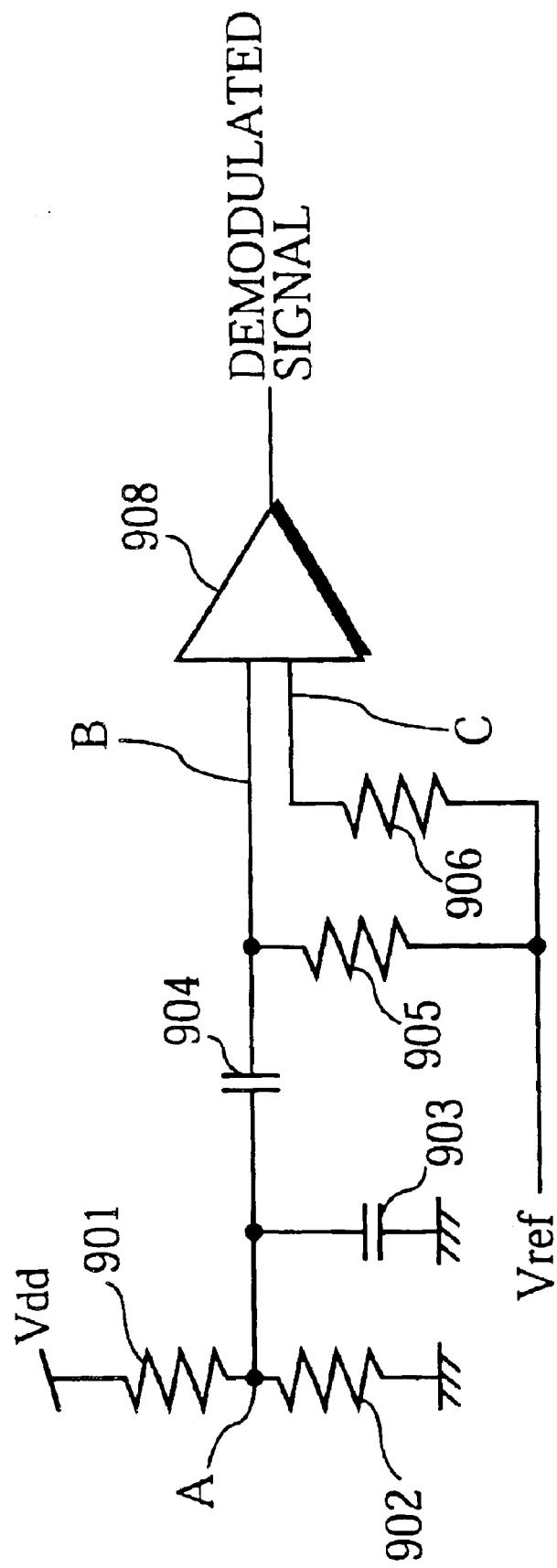
FIG. 3 is a circuit diagram showing an example construction of a demodulator circuit equipped in a modulation/demodulation unit in the IC shown in FIG. 2.
Figure 4:
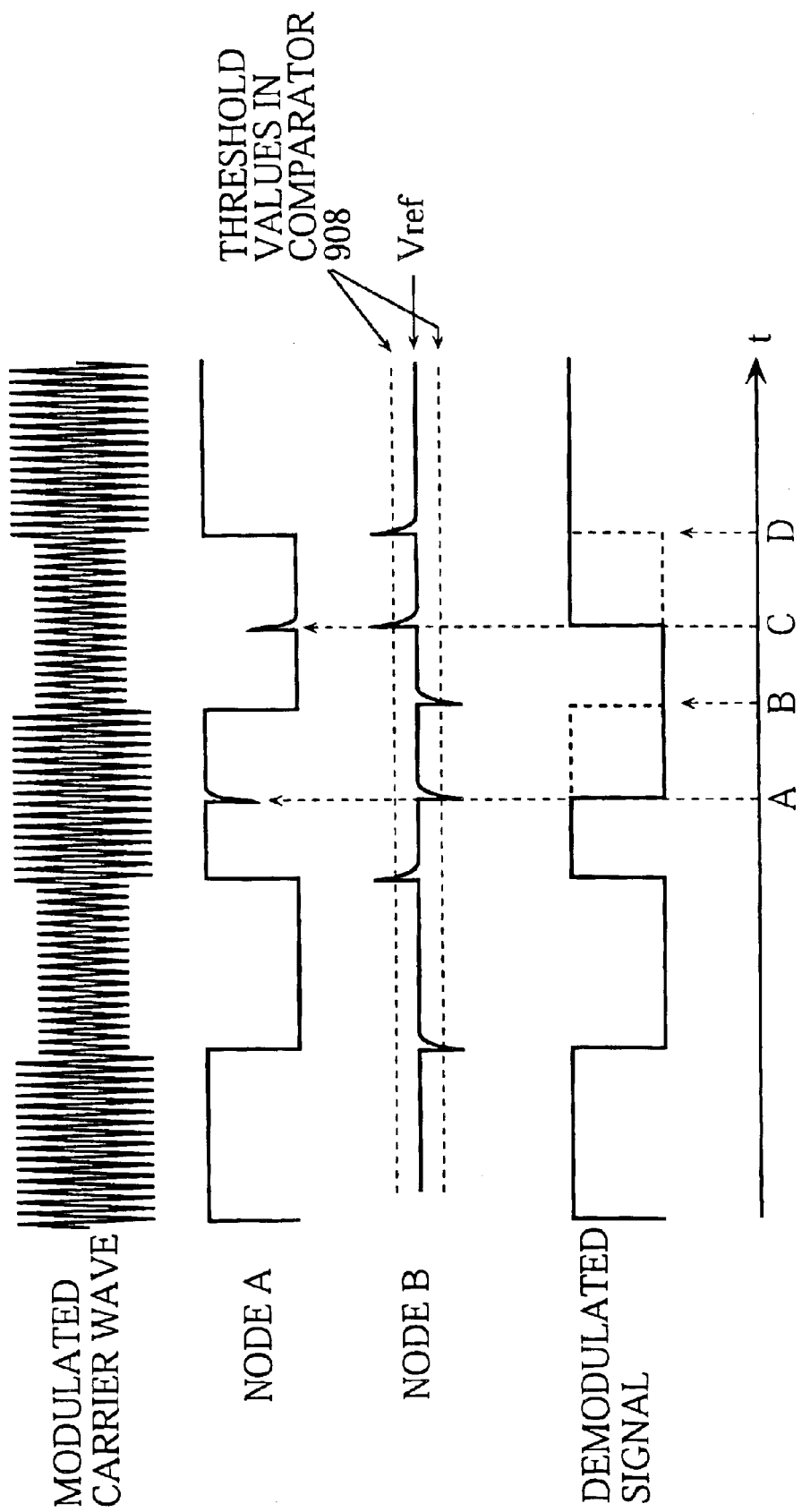
FIG. 4 is a timing chart showing the voltage level of each node in the demodulator circuit in FIG. 3.
Figure 5:
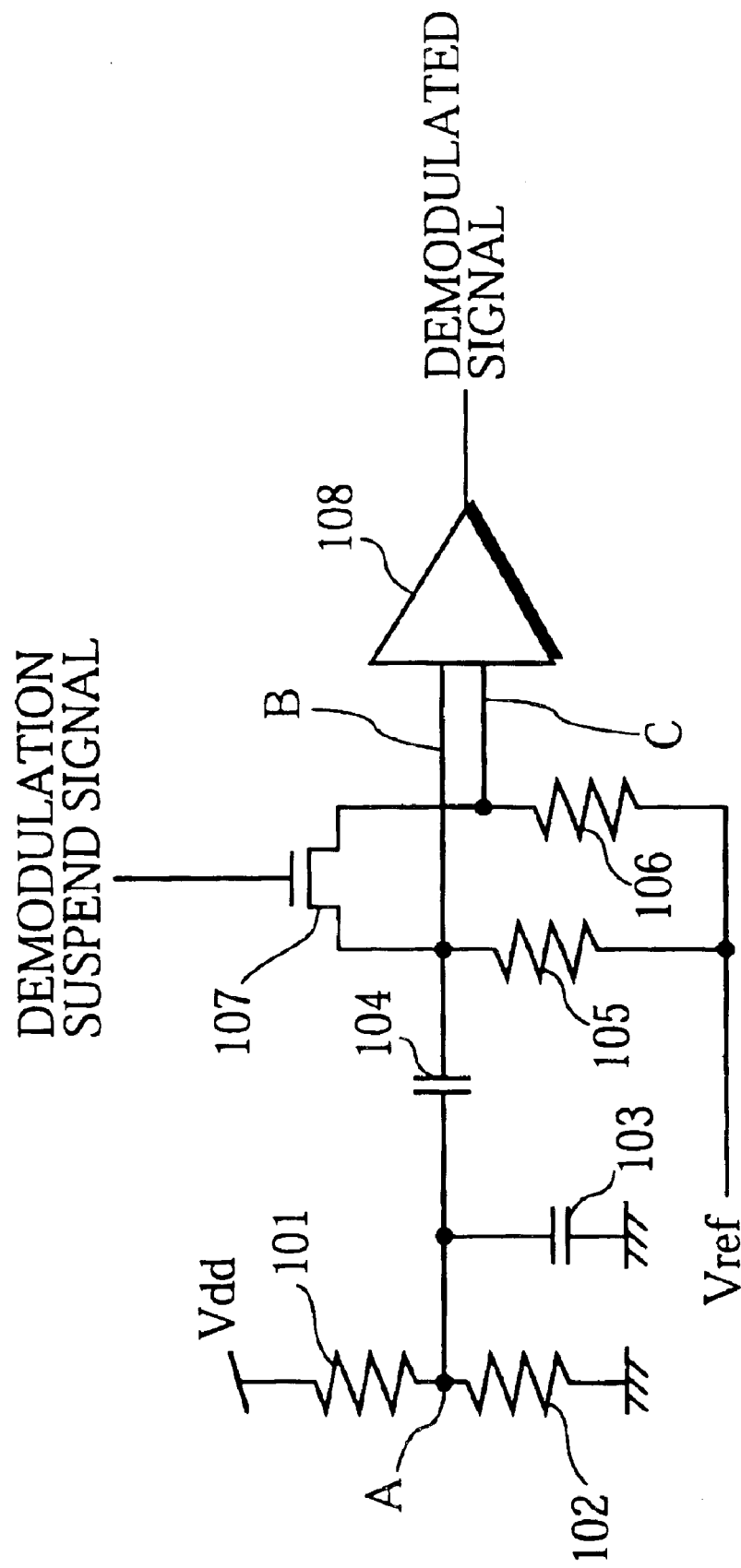
FIG. 5 is a circuit diagram showing an example construction of a demodulator circuit equipped in a modulation/demodulation unit in a contactless IC card according to the first embodiment of the invention.

FIG. 5 is a circuit diagram showing an example construction of a demodulator circuit equipped in a modulation/demodulation unit 41 in a contactless IC card 10 according to the first embodiment of the invention. This demodulator circuit differs with that shown in FIG. 3 in that it is equipped with a transistor 107 for short-circuiting the two input terminals (nodes B and C) of a comparator 108 at predetermined timing to prevent the output of the comparator 108 from being inverted. The construction elements aside from the transistor 107, i.e. resistors 101 and 102, capacitors 103 and 104, resistors 105 and 106, and the comparator 108, are the same as those shown in FIG. 3, so that their detailed explanation has been omitted here.

To be more specific, node B and node C are respectively connected to the source and drain of the transistor 107, and a demodulation suspend signal is inputted in the gate of the transistor 107. With this construction, node B and node C are short-circuited while the demodulation suspend signal is on, thereby preventing the output of the comparator 108 from being inverted even if noise occurs in power supply voltage waveform.

Figure 6:
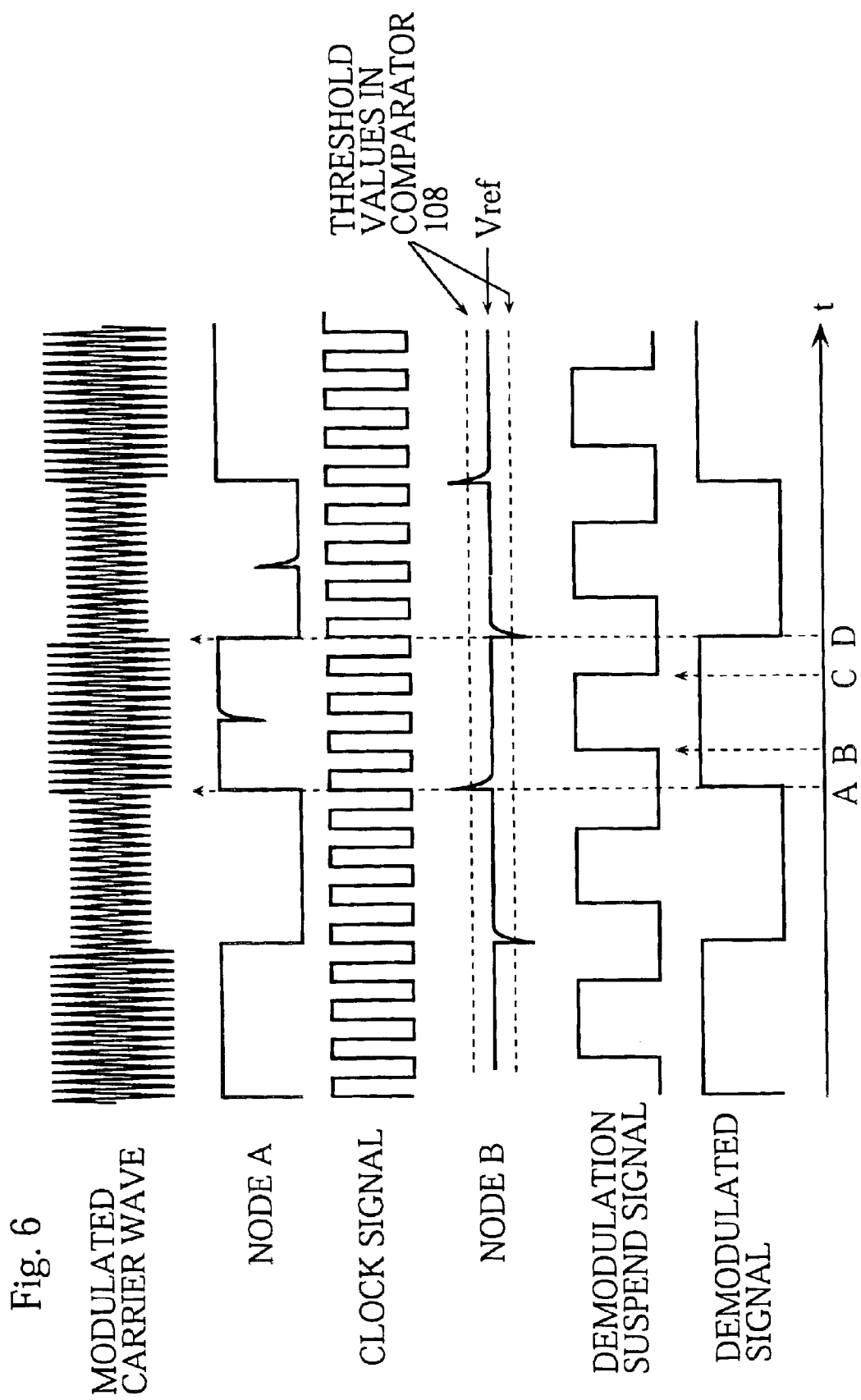
FIG. 6 is a timing chart showing the voltage level of each node in the demodulator circuit in FIG. 5, together with the waveform of a demodulation suspend signal.

Such a demodulation suspend signal is generated in the following manner. FIG. 6 is a timing chart showing the voltage level of each node in the demodulator circuit in FIG. 5, along with the waveform of the demodulation suspend signal.

The contactless IC card system embodied here conforms to ISO14443 Type B, whereby data of about 212 kHz is piggybacked on a carrier wave of 13.56 MHz. Though the modulation factor is set to be around 10% in this embodiment, the modulation factor is not limited to such. Also, the contactless IC card 10 here is provided with a clock generator circuit (not illustrated), from which a clock signal generated by frequency-dividing a received carrier wave is supplied to the control unit 42, the memory unit 43, and the like. In this embodiment, a carrier wave of 13.56 MHz is frequency-divided by 4, so that a clock signal of 3.39 MHz is generated and supplied to the aforementioned construction elements of the contactless IC card 10.

Signals conveyed from the R/W 30 via the carrier wave include a dotting signal (e.g. "010101010") and a SYNC signal (e.g. "01010011") for establishing synchronization between the R/W 30 and the contactless IC card 10. Through the use of these signals, the control unit 42 detects the timing at which a rising or falling edge of the clock signal occurs, and the timing at which a change of a data value (data 0 to data 1, data 1 to data 0) may take place (i.e. the timing at which a transition from one bit to the succeeding bit occurs). With such detected timings, the control unit 42 can determine timings such as of reading the demodulated signal, of turning the demodulation suspend signal on, and of accessing the memory unit 43.

For instance, on receiving the SYNC signal, the control unit 42 starts counting the number of edges of the clock signal using an internal counter, and turns the demodulation suspend signal on at a rising edge (e.g. at point B) following a rising edge (e.g. at point A) where a change of a data value may take place. Since the demodulation suspend signal is inputted in the gate of the transistor 107, node B and node C are short-circuited while the demodulation suspend signal is on. Accordingly, even when noise occurs in power supply voltage waveform during this period, the output (demodulated signal) of the comparator 108 is kept from being inverted. In the meantime, the control unit 42 accesses the memory unit 43 while the demodulation suspend signal is on. Once the time has come when there is no danger of noise caused by the access to the memory unit 43, the control unit 42 turns the demodulation suspend signal off (e.g. at point C), to resume the demodulation of the data piggybacked on the carrier wave. In FIG. 6, for example, there is a possibility that a change of a data value may take place at point A and/or point D, so that the control unit 42 exercises such a control that turns the demodulation suspend signal off at least prior to these points.

In so doing, even if noise appears in power supply voltage waveform due to an access made to the memory unit 43 or other cause, incorrect data recovery can be avoided.

Second Embodiment

In the first embodiment, the demodulation suspend signal is applied to the gate of the transistor 107 to cause a short between node B and node C, so as to prevent incorrect data recovery caused by occurrence of noise in power supply voltage waveform. In the second embodiment, on the other hand, the time constant of the differential circuit made up of the capacitor 104 and the resistor 105 is increased when the demodulation suspend signal becomes on, to keep the voltage at node B from exceeding the threshold value of the comparator 108 even if noise occurs in power supply voltage waveform.

Figure 7:
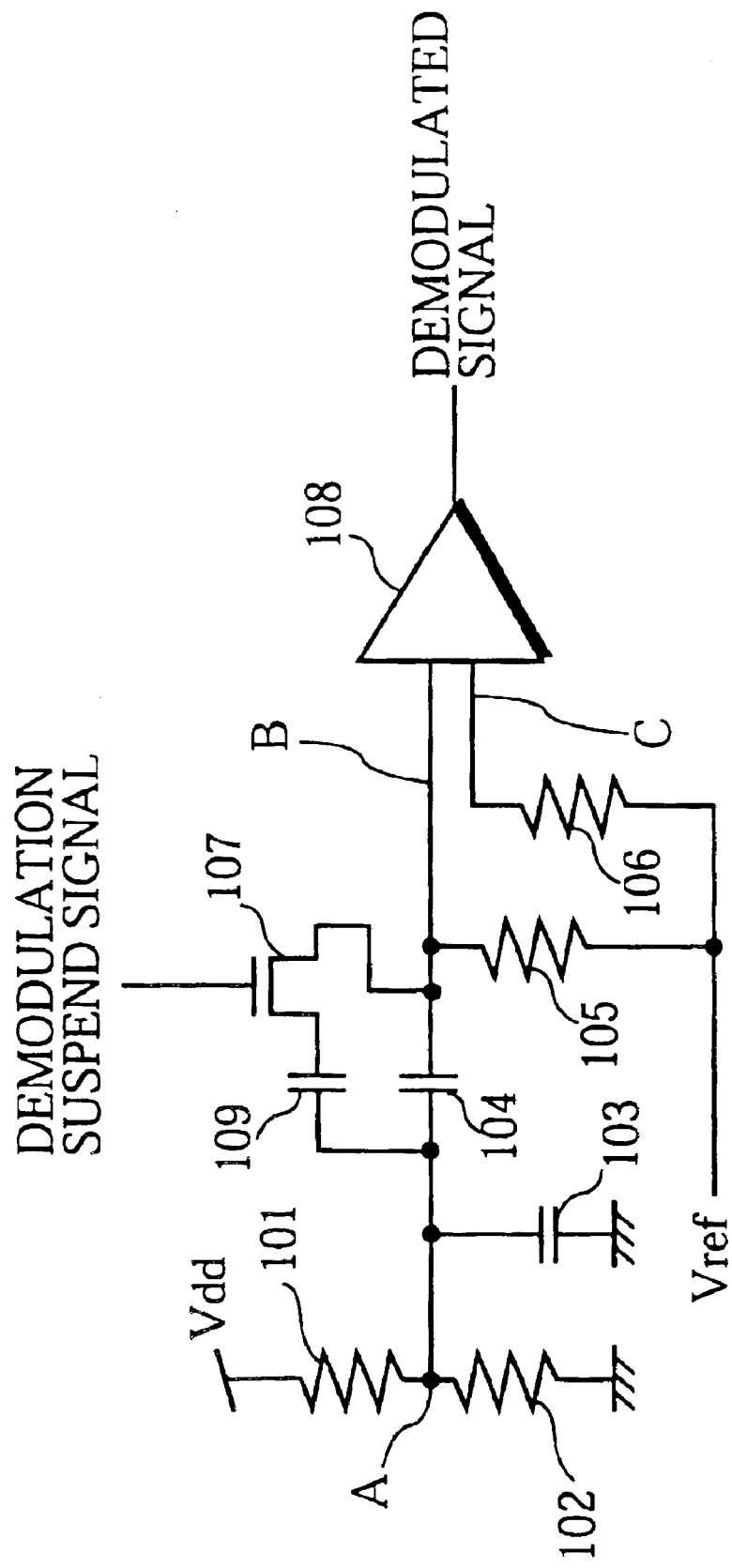
FIG. 7 is a circuit diagram showing an example construction of a demodulator circuit equipped in a modulation/demodulation unit in a contactless IC card according to the second embodiment of the invention.

FIG. 7 is a circuit diagram showing an example construction of a demodulator circuit equipped in the modulation/demodulation unit 41 in the contactless IC card 10 according to the second embodiment of the invention. As shown in the figure, a new capacitor 109 is connected in parallel with the capacitor 104, and the transistor 107 is connected to the capacitor 109, with the demodulation suspend signal being inputted in the gate of the transistor 107. With this construction, the time constant of the CR time constant circuit made up of the capacitor 104 and the resistor 105 is sustained at a higher level while the demodulation suspend signal is on.

As a result, even when noise appears in power supply voltage waveform, the voltage at node B will not exceed the threshold value in the comparator 108, so that the output of the comparator 108 can be kept from being inverted. Here, it is preferable to optimize the capacitance of the capacitor 109 in consideration of the threshold values of the comparator 108 so that the voltage at node B when noise arises will not exceed any of the threshold values.

Third Embodiment

In the third embodiment, the width of the hysteresis of the comparator 108 is increased (i.e. the upper and lower threshold values of the comparator 108 are respectively increased and decreased by a certain amount) when the demodulation suspend signal becomes on, to thereby prevent incorrect data recovery caused by occurrence of noise in power supply voltage waveform.

Figure 8:
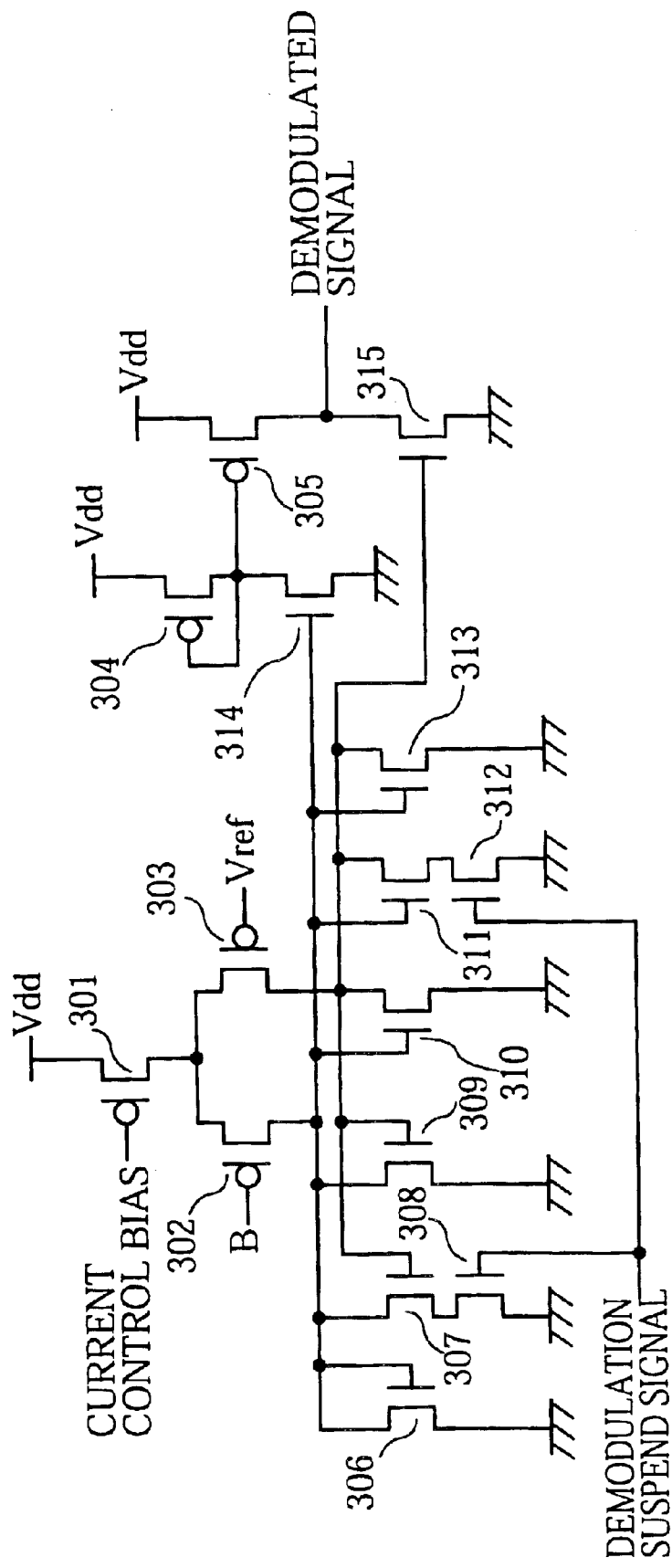
FIG. 8 is a circuit diagram showing an example construction of a comparator in a demodulator circuit equipped in a modulation/demodulation unit in a contactless IC card according to the third embodiment of the invention.

FIG. 8 is a circuit diagram showing an example construction of a comparator 108 in a demodulator circuit according to this embodiment. This comparator 108 includes P-channel MOS transistors (hereinafter, "PchMOS transistor") 301 to 305 and N-channel MOS transistors (hereinafter, "NchMOS transistor") 306 to 315. The power supply voltage (Vdd) is inputted in the sources of the PchMOS transistors 301, 304, and 305.

Also, a bias for current control is applied to the gate of the PchMOS transistor 301. The level of this bias voltage is not particularly limited, but is determined based on Vdd and Vref. The voltage of node B is applied to the gate of the PchMOS transistor 302, and the voltage (Vref) of node C is applied to the gate of the PchMOS transistor 303.

Further, the demodulation suspend signal is inputted in the gates of the NchMOS transistors 308 and 312. As a result, the upper and lower threshold values in the comparator 108 are sustained respectively at higher and lower levels while the demodulation suspend signal is on, with it being possible to prevent incorrect data recovery.

Figure 9:
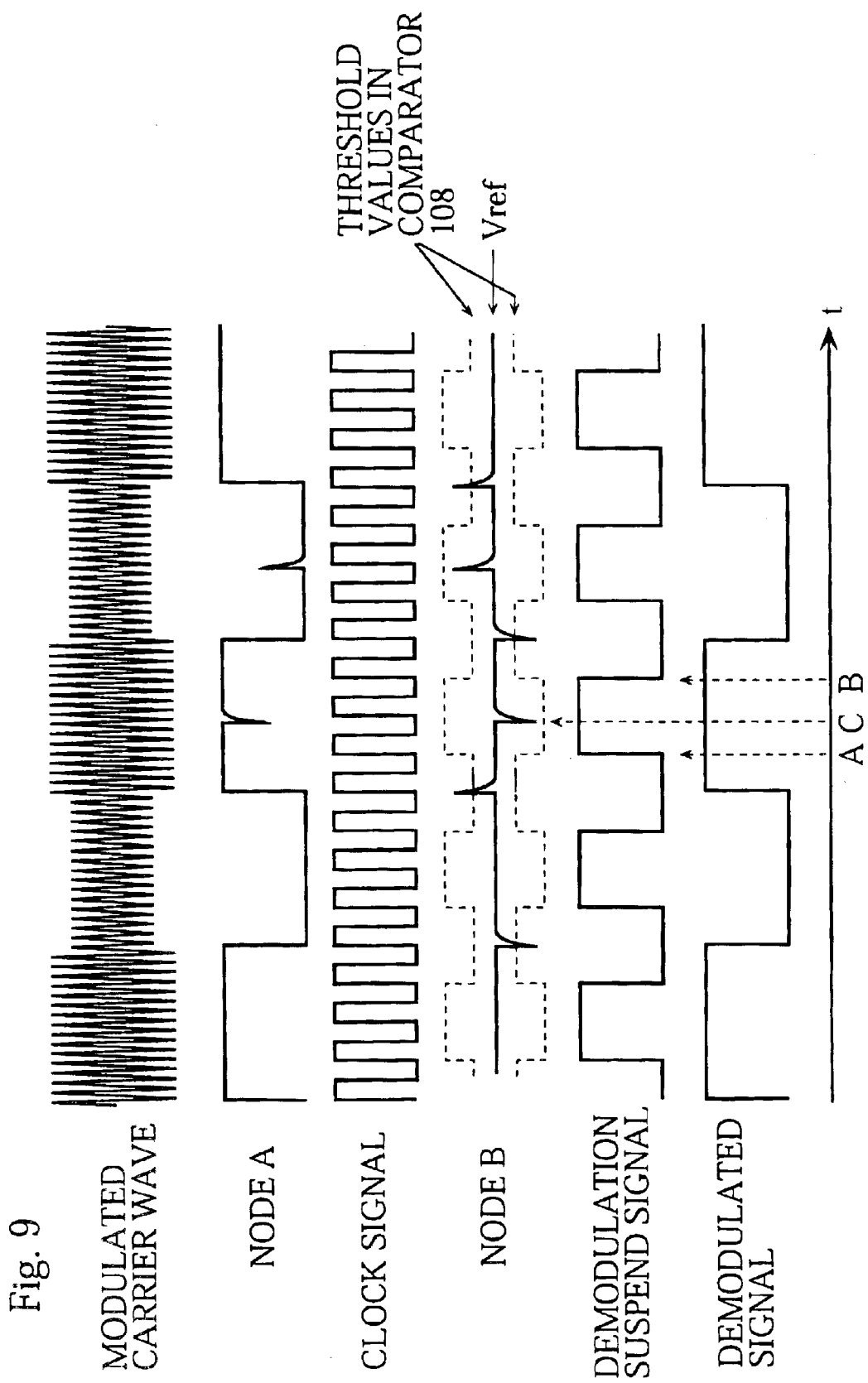
FIG. 9 is a timing chart showing the voltage level of each node in the demodulator circuit of the third embodiment, together with the waveform of the demodulation suspend signal.

FIG. 9 is a timing chart showing the voltage level of each node in the demodulator circuit of the third embodiment, together with the waveform of the demodulation suspend signal. As illustrated, even when the input voltage at node B changes due to occurrence of noise (e.g. at point C), the upper and lower threshold values in the comparator 108 are maintained respectively at higher and lower levels while the demodulation suspend signal is on (e.g. from point A to point B), so that the inversion of the demodulated signal will not occur despite the presence of the noise.

Thus, incorrect data recovery caused by noise in power supply voltage waveform can be prevented by varying the width of the hysteresis of the comparator 108.

Modifications

While the present invention has been described based on the foregoing embodiments, the invention is not limited to such. For instance, the following modifications are possible.

(1) The first to third embodiments may be used in varying combinations.

(2) In the above embodiments, the invention has been applied to the demodulator circuit in which the voltage-divided signal of the power supply voltage (Vdd) flows through the differential circuit made up of the capacitor 104 and the resistor 105 and the resulting differential waveform is inputted in the comparator 108.

Figure 10:
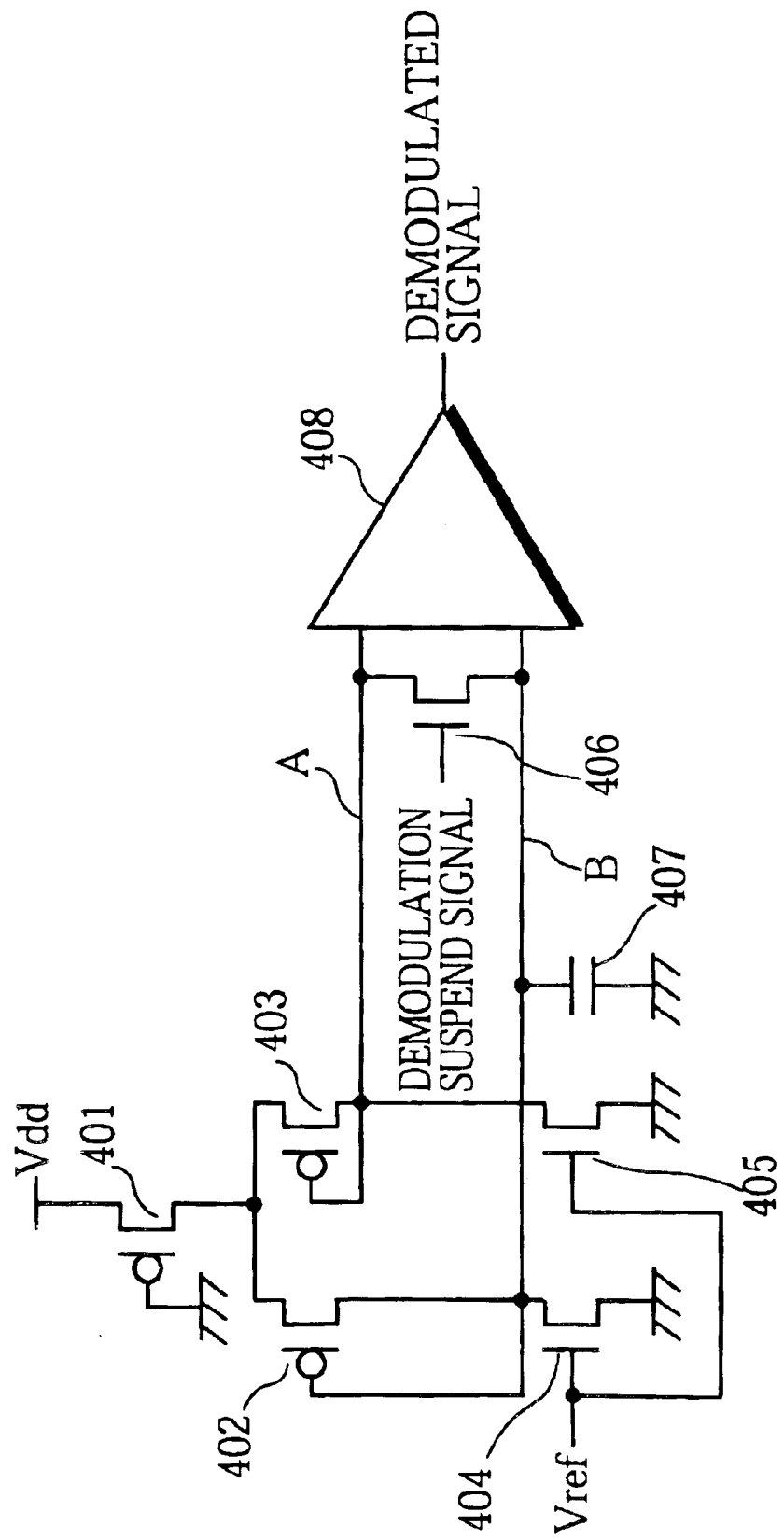
FIG. 10 is a circuit diagram showing an example construction of a demodulator circuit as a variant of the invention.

However, the invention may also be applied to demodulator circuits of different constructions. FIG. 10 illustrates an application of the invention to a demodulator circuit of a construction different with that embodied above. This demodulator circuit includes PchMOS transistors 401 to 403, NchMOS transistors 404 to 406, a capacitor 407, and a comparator 408. The power supply voltage (Vdd) is applied to the source of the PchMOS transistor 401, and the reference voltage (Vref) is applied to the gates of the NchMOS transistors 404 and 405. Here, one input of the comparator 408 is referred to as node A, and the other input as node B.

This demodulator circuit operates on the following principle. When Vdd decreases, the change in voltage at node B to which the capacitor 407 is connected appear slower than the change in voltage at node A. Which is to say, in the event of a Vdd drop, the voltage at node A remains below the voltage at node B for a certain period. When this happens, the comparator 408 detects the Vdd drop and drives the demodulated signal low. The same principle applies to the case of a Vdd increase.

However, given that power consumption of the memory unit 43 or the like is quite large, it may induce noise in power supply voltage waveform large enough to be mistaken as a change of a data value, thereby causing incorrect data recovery. To prevent this, the transistor 406 is inserted between node A and node B and the demodulation suspend signal is inputted in the gate of the transistor 406, in order to short-circuit node A and node B.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A contactless IC card comprising:
   a demodulator circuit which receives a carrier wave that has been amplitude shift keying (ASK) modulated with digital data, and demodulates the ASK-modulated carrier wave to recover the digital data;
   a memory unit; and
   suspending means which suspends the demodulation by the demodulator circuit during a period within each period corresponding to a bit of the digital data where there is no possibility of a change of a data value of the bit in the digital data;
   wherein the memory unit is accessed while the suspending means is suspending the demodulation.

2. The contactless IC card of claim 1,
   wherein the demodulator circuit includes:
   a detector circuit which detects an envelope the ASK modulated carrier wave;
   a reference voltage generator circuit which outputs a reference voltage;
   a differential circuit which receives the envelope from the detector circuit, and outputs differential components of the received envelope based on the reference voltage; and
   a comparator circuit which includes a first input terminal for receiving the output of the differential circuit, a second input terminal for receiving the output of the reference voltage generator circuit, and an output terminal, compares a voltage at the first input terminal and a voltage at the second input terminal, and inverts an output of the output terminal if a difference between the two voltages exceeds a predetermined value.

3. A contactless IC card comprising:
   a demodulator circuit which receives a carrier wave that has been ASK-modulated with digital data, and demodulates the ASK-modulated carrier wave to recover the digital data; and suspending means which suspends the demodulation by the demodulator circuit during periods where there is no possibility of a change of a data value in the digital data;
   wherein the demodulator circuit includes:
   a detector circuit which detects an envelope of the ASK-modulated carrier wave;
   a reference voltage generator circuit which outputs a reference voltage;
   a differential circuit which receives the envelope from the detector circuit, and outputs differential components of the received envelope based on the reference voltage; and
   a comparator circuit which includes a first input terminal for receiving the output of the differential circuit, a second input terminal for receiving the output of the reference voltage generator circuit, and an output terminal, compares a voltage at the first input terminal and a voltage at the second input terminal, and inverts an output of the output terminal if a difference between the two voltages exceeds a predetermined value; and
   wherein the suspending means includes:
   a short-circuit control circuit which short-circuits the first input terminal and the second input terminal during the periods where there is no possibility of a change of a data value in the digital data; and
   a short-circuit control signal output circuit which outputs a short-circuit control signal to the short-circuit control circuit, to indicate the periods during which there is no possibility of a change of a data value in the digital data.

4. The contactless IC card of claim 3,
   wherein the short-circuit control circuit is a transistor whose source and drain are connected to different terminals among the first and second input terminals of the comparator circuit, and whose gate receives the short-circuit control signal.

5. The contactless IC card of claim 4,
   wherein the short-circuit control signal output circuit includes:
   a clock generator circuit which generates a clock signal;
   a counter which counts the number of edges of the clock signal; and controlling means which exercises control so that the short-circuit control signal is asserted when the count in the counter reaches a predetermined number.

6. The contactless IC card of claim 5, further comprising a memory which stores the recovered digital data under the control by the controlling means,
wherein the controlling means accesses the memory during periods where the short-circuit control signal stays asserted.

7. A contactless IC card comprising:
a demodulator circuit which receives a carrier wave that has been ASK-modulated with digital data, and demodulates the ASK-modulated carrier wave to recover the digital data; and suspending means which suspends the demodulation by the demodulator circuit during periods where there is no possibility of a change of a data value in the digital data;
wherein the demodulator circuit includes:
 a detector circuit which detects an envelope of the ASK-modulated carrier wave;
 a reference voltage generator circuit which outputs a reference voltage;
 a differential circuit which receives the envelope from the detector circuit, and outputs differential components of the received envelope based on the reference voltage; and
 a comparator circuit which includes a first input terminal for receiving the output of the differential circuit, a second input terminal for receiving the output of the reference voltage generator circuit, and an output terminal, compares a voltage at the first input terminal and a voltage at the second input terminal, and inverts an output of the output terminal if a difference between the two voltages exceeds a predetermined value; and
wherein the differential circuit is a CR time constant circuit; and
wherein the suspending means includes:
 a time constant increase circuit which sustains a time constant of the CR time constant circuit at a higher level during the periods where there is no possibility of a change of a data value in the digital data; and
 a time constant control signal output circuit which outputs a time constant control signal to the time constant increase circuit, to indicate the periods during which there is no possibility of a change of a data value in the digital data.

8. The contactless IC card of claim 7,
wherein the time constant increase circuit includes:
a first capacitor which is connected in parallel with a second capacitor included in the CR time constant circuit; and
a switching element which is connected in series with the first capacitor, and receives the time constant control signal from the time-constant control signal output circuit.

9. The contactless IC card of claim 8,
wherein the switching element is a transistor whose source or drain is connected with the first capacitor, and whose gate receives the time constant control signal.

10. The contactless IC card of claim 7,
wherein the time constant control signal output circuit includes:
a clock generator circuit which generates a clock signal;
a counter which counts the number of edges of the clock signal; and controlling means which exercises control SQ that the time constant control signal is asserted when the count in the counter reaches a predetermined number.

11. The contactless IC card of claim 10, further comprising
a memory which stores the recovered digital data under the control by the controlling means,
wherein the controlling means accesses the memory during periods where the time constant control signal stays asserted.

12. A contactless IC card comprising:
a demodulator circuit which receives a carrier wave that has been ASK-modulated with digital data, and demodulates the ASK-modulated carrier wave to recover the digital data;
a memory unit; and
suspending means which suspends the demodulation by the demodulator circuit during periods where there is no possibility of a change of a data value in the digital data;
wherein the demodulator circuit includes:
 a detector circuit which detects an envelope of the ASK-modulated carrier wave;
 a reference voltage generator circuit which outputs a reference voltage;
 a differential circuit which receives the envelope from the detector circuit, and outputs differential components of the received envelope based on the reference voltage; and
 a comparator circuit which includes a first input terminal for receiving the output of the differential circuit, a second input terminal for receiving the output of the reference voltage generator circuit, and an output terminal, compares a voltage at the first input terminal and a voltage at the second input terminal, and inverts an output of the output terminal if a difference between the two voltages exceeds a predetermined value; and
wherein the comparator circuit has a hysteresis between upper and lower threshold values with respect to the reference voltage, the upper threshold value being a sum of the predetermined value and the reference voltage, and the lower threshold value being a difference of the predetermined value from the reference voltage;
wherein the suspending means includes a hysteresis control signal output circuit which outputs a hysteresis control signal to the comparator circuit, to indicate the periods during which there is no possibility of a change of a data value in the digital data;
wherein the comparator circuit includes a hysteresis control circuit which sustains the predetermined value at a higher level to thereby sustain the width of the hysteresis at a greater level, during the periods where there is no possibility of a change of a data value in the digital data; and
wherein the memory unit is accessed while the suspending means is suspending the demodulation.

13. A contactless IC card comprising:
a demodulator circuit which receives a carrier wave that has been ASK-modulated with digital data, and demodulates the ASK-modulated carrier wave to recover the digital data; and
suspending means which suspends the demodulation by the demodulator circuit during periods where there is no possibility of a change of a data value in the digital data;

wherein the demodulator circuit includes:
a detector circuit which detects an envelope of the ASK-modulated carrier wave;
a reference voltage generator circuit which outputs a reference voltage;
a differential circuit which receives the envelope from the detector circuit, and outputs differential components of the received envelope based on the reference voltage; and
a comparator circuit which includes a first input terminal for receiving the output of the differential circuit, a second input terminal for receiving the output of the reference voltage generator circuit, and an output terminal, compares a voltage at the first input terminal and a voltage at the second input terminal, and inverts an output of the output terminal if a difference between the two voltages exceeds a predetermined value; and
wherein the comparator circuit has a hysteresis between upper and lower threshold values with respect to the reference voltage, the upper threshold value being a sum of the predetermined value and the reference voltage, and the lower threshold value being a difference of the predetermined value from the reference voltage;
wherein the suspending means includes a hysteresis control signal output circuit which outputs a hysteresis control signal to the comparator circuit, to indicate the periods during which there is no possibility of a change of a data value in the digital data;
wherein the comparator circuit includes a hysteresis control circuit which sustains the predetermined value at a higher level to thereby sustain the width of the hysteresis at a greater level, during the periods where there is no possibility of a change of a data value in the digital data; and
wherein the hysteresis control signal output circuit includes:
a clock generator circuit which generates a clock signal;
a counter which counts the number of edges of the clock signal; and
controlling means which exercises control so that the hysteresis control signal is asserted when the count in the counter reaches a predetermined number.

14. The contactless IC card of claim 13, further comprising
a memory which stores the recovered digital data under the control by the controlling means,
wherein the controlling means accesses the memory during periods where the hysteresis control signal stays asserted.

15. A contactless IC card comprising:
a demodulator circuit which includes a comparator circuit having first and second input terminals, and which receives a carrier wave that has been ASK-modulated with digital data, and demodulates the ASK-modulated carrier wave to recover the digital data; and
a suspension unit which, in response to a short circuit control signal which indicates periods during which there is no possibility of a change of a data value in the digital data, short-circuits the first and second input terminals of the comparator circuit to suspend demodulation by the demodulator circuit including;
a short-circuit control circuit which short-circuits the first input terminal and the second input terminal during the periods where there is no possibility of a change of a data value in the digital data and a short-circuit control signal output circuit which outputs a short-circuit control signal to the short-circuit control circuit, to indicate the periods during which there is no possibility of a change of a data value in the digital data.

16. A contactless IC card comprising:
a demodulator circuit which receives a carrier wave that has been ASK-modulated with digital data, determines the times at which data changes occur, and demodulates the ASK-modulated carrier wave to recover the digital data;
a memory unit; and
a suspension unit which suspends the demodulation by the demodulator circuit during inter-bit periods, wherein each inter-bit period begins after the time at which a data change occurs and ends prior to the time at which the immediately following data change occurs;
wherein the memory unit is accessed while the suspending means is suspending the demodulation.

17. The contactless IC card of claim 16 wherein the demodulator circuit is powered by energy obtained from the ASK modulated carrier wave.

18. The contactless IC card of claim 16 further comprising a clock generating circuit generating a clock signal by frequency-dividing the ASK modulated carrier wave; wherein the clock signal is used to determine the periods during which demodulation is suspended.

* * * * *

UNITED STATES PATENT AND TRADEMARK OFFICE
CERTIFICATE OF CORRECTION

PATENT NO. : 6,907,088 B1
DATED : June 14, 2005
INVENTOR(S) : Joji Nakane et al.

It is certified that error appears in the above-identified patent and that said Letters Patent is hereby corrected as shown below:

Column 10,
Line 1, delete "SQ" and insert -- so --.

Signed and Sealed this

Eleventh Day of April, 2006

JON W. DUDAS
*Director of the United States Patent and Trademark Office*